(12) United States Patent
Hallstrom

(10) Patent No.: US 6,651,806 B2
(45) Date of Patent: Nov. 25, 2003

(54) SEALLESS SLAT-TYPE RECIPROCATING CONVEYOR

(76) Inventor: Olof A. Hallstrom, 1920 Hallstrom Rd., Tillamook, OR (US) 97141

( * ) Notice: Subject to any disclaimer, the term of this patent is extended or adjusted under 35 U.S.C. 154(b) by 0 days.

(21) Appl. No.: 10/245,929

(22) Filed: Sep. 17, 2002

(65) Prior Publication Data

US 2003/0201154 A1 Oct. 30, 2003

Related U.S. Application Data

(60) Provisional application No. 60/376,064, filed on Apr. 25, 2002.

(51) Int. Cl.$^7$ .............................................. B65G 25/04
(52) U.S. Cl. .................................................. 198/750.3
(58) Field of Search ........................... 198/750.1, 750.2, 198/750.3

(56) References Cited

U.S. PATENT DOCUMENTS

| | | |
|---|---|---|
| 4,184,587 A | 1/1980 | Hallstrom |
| 4,727,978 A | 3/1988 | Hallstrom |
| 4,856,645 A | 8/1989 | Hallstrom |
| 5,088,595 A | 2/1992 | Hallstrom |
| 5,415,271 A * | 5/1995 | Foster ...................... 198/750.3 |
| 6,257,396 B1 | 7/2001 | Quaeck |

FOREIGN PATENT DOCUMENTS

DE 3731612 * 4/1989 .............. 198/750.3

* cited by examiner

Primary Examiner—James R. Bidwell
(74) Attorney, Agent, or Firm—Olson and Olson

(57) ABSTRACT

The sealless slat-type reciprocating conveyor of this invention includes on one side edge of each slat an upwardly extending inverted U-shape portion and on the opposite side edge an upwardly extending substantially straight flange portion configured for reception within the inverted U-shape portion of the adjacent slat to provide a passageway that extends upwardly from adjacent the load-supporting surface of the adjacent slat, thence around the upper end of the flange and downward to the space between adjacent slats.

2 Claims, 2 Drawing Sheets

US 6,651,806 B2

SEALLESS SLAT-TYPE RECIPROCATING CONVEYOR

This application claims the benefit of Provisional application Serial No. 60/376,064, filed Apr. 25, 2002.

BACKGROUND OF THE INVENTION

This invention relates to reciprocating conveyors of the slat-type for conveying particulate materials, and more particularly to a slat-type reciprocating conveyor which requires no seal between adjacent slats.

Slat-type reciprocating conveyors of the prior art for conveying particulate materials generally are characterized by the use of seals between adjacent slats to minimize the loss of particulates through the space between the slats. Sealless slat-type reciprocating conveyors provided heretofore are designed primarily to avoid the cost of seals and the installation and replacement thereof. Such prior art conveyors provide structure for the discharge of particulates that pass through the unsealed space between the slats. Representative of such conveyors is that disclosed in U.S. Pat. No. 6,257,396 wherein it is disclosed that particulate material entering the unsealed space between adjacent slats is cleared away during the conveying process and/or routine maintenance. In either case the removed particulate material represents a loss of product.

SUMMARY OF THE INVENTION

In its basic concept, the sealless slat-type reciprocating conveyor of this invention is produced by configuring the cooperating overlapping side edges of adjacent conveyor slats to form an upwardly extending narrow channel section leading to a downwardly extending channel section terminating at the bottom of the slats.

It is the principal objective of this invention to provide a sealless slat-type reciprocating conveyor of the class described which inhibits passage of particulates through the space between adjacent spots.

Another objective of this invention is the provision of a sealless slat-type reciprocating conveyor of the class described in which the omission of a seal between adjacent slats is achieved by forming in one longitudinal edge of a slat an upwardly projecting inverted U-shaped section and in the confronting edge of an adjacent slat a longitudinal upwardly projecting flange section configured for free reception within the space formed by the U-shaped section.

Still another objective of this invention is the provision of a sealless slat-type reciprocating conveyor of the class described which avoids the costs associated with seals by minimizing the loss of particulate material from the conveyor.

A further objective of this invention is to provide a sealless slat-type reciprocating conveyor of the class described which is of simplified construction for economical manufacture, maintenance and repair.

The foregoing and other objects and advantages of this invention will appear from the following detailed description, taken in connection with the accompanying drawings of preferred embodiments.

DESCRIPTION OF THE PREFERRED EMBODIMENTS

Figure 1:
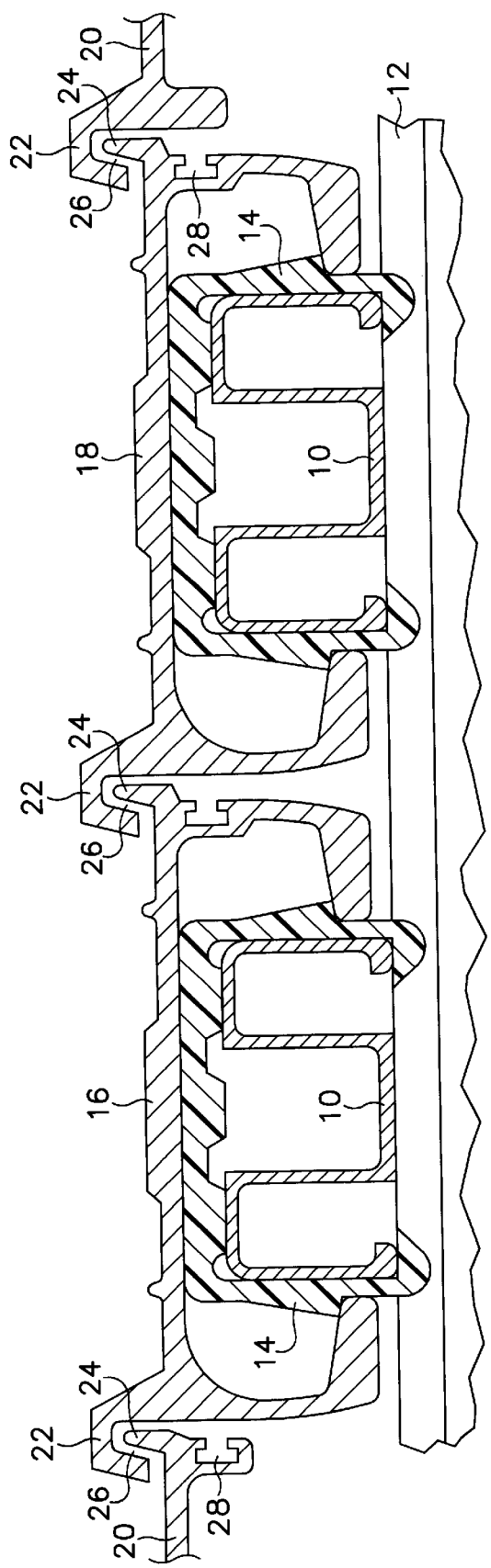
FIG. 1 is a fragmentary view in transverse section of a support frame mounting a corresponding portion of a sealless slat-type reciprocating conveyor embodying the features of this invention.

FIG. 1 of the drawings is a fragmentary end view showing a structural configuration of overlapping side edges of adjacent slats which require no seal to prevent the escape of particulate material carried on the conveyor assembly. The structural configuration is similar to that shown in applicant's earlier U.S. Pat. No. 4,184,587 wherein FIG. 5 shows the structural configuration illustrated herein in FIG. 1.

Thus, elongated slat guide beams 10 are secured to an underlying frame 12, such as the bed of a semi-trailer. The beams 10 may be secured in laterally spaced apart position by bolts, rivets, welding, or other suitable means, and they extend the full length of the frame 12.

Anti-friction bearings 14 are secured to the longitudinal slat guides 10 in the manner disclosed in detail in the aforementioned patent, to provide sliding support for longitudinally extending reciprocative slats 16, 18. Another slat 20 usually is provided to form a 3-slat group which is repeated across the width of the frame 12 to form the complete conveyor support for a particulate load.

This invention involves the cooperative configuration of the opposite side edges of each conveyor slat by which to eliminate the need of a sliding seal to prevent the escape of particulate material downward between adjacent slats. Thus, one longitudinal side edge portion of each slat is offset upwardly, thence laterally outward and thence downward, forming an inverted U-shape trough 22. The opposite lateral side edge of the slat is formed with an upwardly extending flange 24 configured to be received freely within the trough 22 and spaced from the inner surfaces of the trough. This provides an unrestricted channel between them, extending from above the upper, load-supporting surface of the slat, upwardly and thence downward around the flange 24 and communicating with the space between the spaced side edges of adjacent slats.

The outer end of the downward section of the U-shaped trough is spaced slightly upward from the adjacent load-supporting surface of the slat, so that no frictional abrasion occurs between those confronting surfaces. This spacing and the spacing between the inner surfaces of the U-shape trough 22 and flange 24 thereby significantly extends the operating life of the slats while eliminating the costly production, assembly, replacement and resulting operational downtime of the conveyor system.

It is the upward portion 26 of the spacing between the overlapping sections 22 and 24 of adjacent-slats, that inhibits the upward migration and consequent escape of particulate material from the load supporting surface of the conveyor system. Whatever minute amount of particulate fines that may work upward through the space 26, will drop vertically downward to the frame 12 from which it may be removed during periodic maintenance of the conveyor system. Experience has shown no significant accumulation.

FIG. 1 shows a longitudinal key slot 28 which also is shown in FIG. 5 of the aforementioned patent. Although the patent discloses the necessity to utilize the key slot to support a seal to resiliently engage the confronting side wall of the adjacent slat, it has been found that the inverted U-shape 22 and flange 24 of this invention effectively eliminates the need for any seal.

Figure 2:
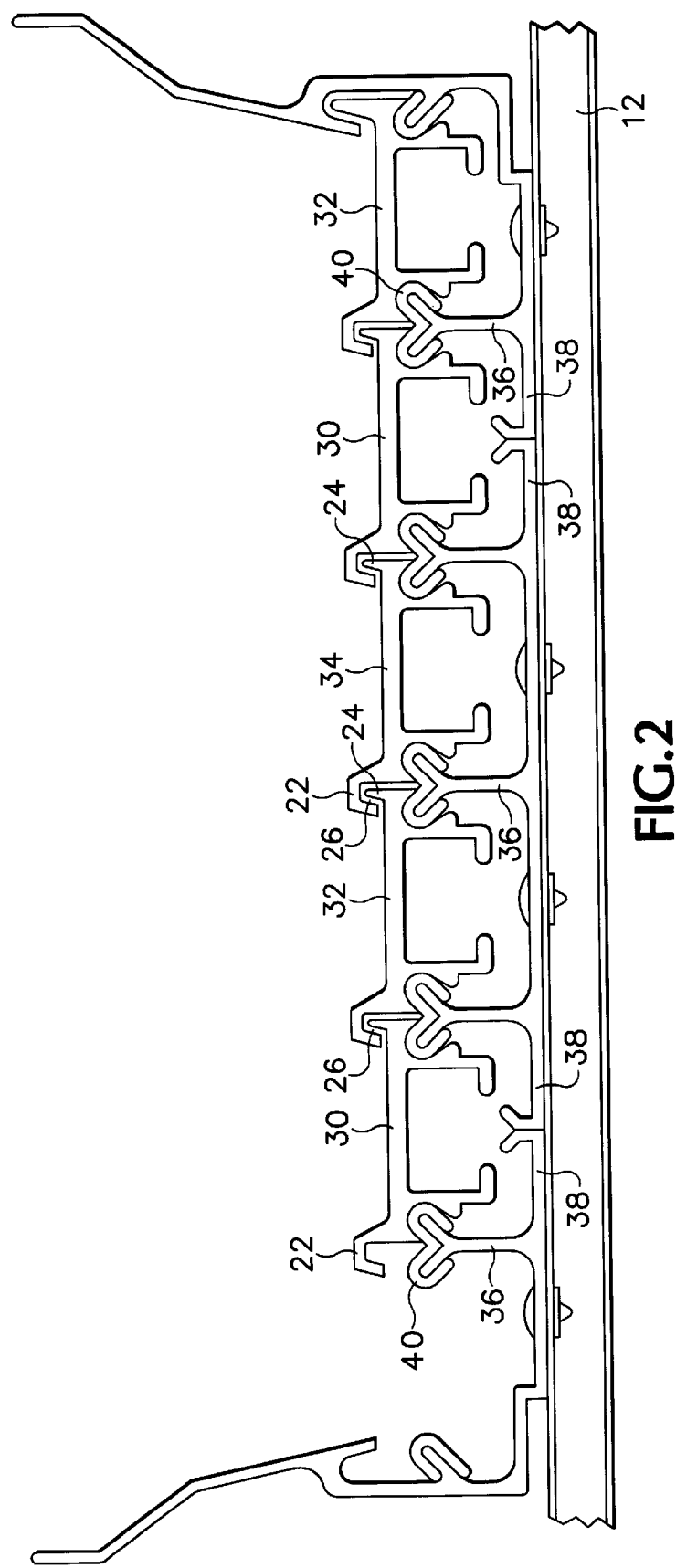
FIG. 2 is an end elevation of a second configuration of sealless slat-type reciprocating conveyor embodying the features of this invention.

FIG. 2 of the drawings illustrates a modified configuration of reciprocating slat-type conveyor similar in general construction to that shown in applicant's presently pending patent application Ser. No. 09/707,540 filed Nov. 6, 2000, and in applicant's earlier U.S. Pat. No. 5,088,595. In this embodiment the elongated slats 30, 32, 34 are supported by upstanding Y-shaped guides 36 on lateral extensions 38. The guides also support a plurality of spaced apart, correspondingly configured anti-friction bearings 40. However, the side sections of each slat are configured in the same manner as in FIG. 1, providing the inverted U-shape trough 22 lapping and spaced from the flange 24 on the opposite side edge of an adjacent slat. This provides the upwardly extending vertical space 26 which inhibits the upward migration of particulate fines, as discussed hereinbefore.

The structural configurations illustrated in FIGS. 1 and 2 merely represent two of the many other structural configurations for supporting slats of a reciprocating conveyor system. Other configurations may be found in a variety of earlier patents, including applicant's U.S. Pat. Nos. 4,727, 978 and 4,856,645. The basic concept of this invention is retained, however, in the configuration of the inverted U-shape trough 22 and flange 24 on opposite side edges of each slat, providing the unsealed space 26 between them.

It will be apparent to those skilled in the art that various other modifications and changes may be made in the size, shape, type, number and arrangement of parts described hereinbefore. For example, although the slats are shown to be formed as an extrusion of aluminum or other suitable metal or synthetic resin, other manufacturing technologies may be employed. This and other changes may be made, as desired, without departing from the spirit of this invention and the scope of the appended claims.

I claim:

1. A sealless slat-type reciprocating conveyor, comprising:
    a) a conveyor slat support frame,
    b) a plurality of elongated conveyor slats supported on the frame for longitudinal reciprocation,
    c) one longitudinal side portion of each of adjacent slats having a substantially inverted U-shape cross section extending upwardly from the load-supporting surface of the slat,
    d) the opposite longitudinal side portion of said slat having an upwardly extending flange configured for free reception upwardly into the space within the inverted U-shape side portion of the adjacent conveyor slat,
    e) the terminal end of the inverted U-shape portion being spaced from the load-supporting surface of the adjacent slat and the flange portion being spaced from the inner surface of the U-shape portion for providing a passageway extending upwardly from the load-supporting surface of the adjacent slat and around the upper end of the flange and thence downwardly to the space between the adjacent slats.

2. The conveyor of claim 1 wherein the slats are of uitary construction with the U-shape side portion and flange side portion formed integral with the intermediate load-supporting portion.

* * * * *